Feb. 22, 1944.    S. A. MINERA    2,342,358
FRUIT STEMMER AND METHOD
Filed May 12, 1941    4 Sheets-Sheet 1
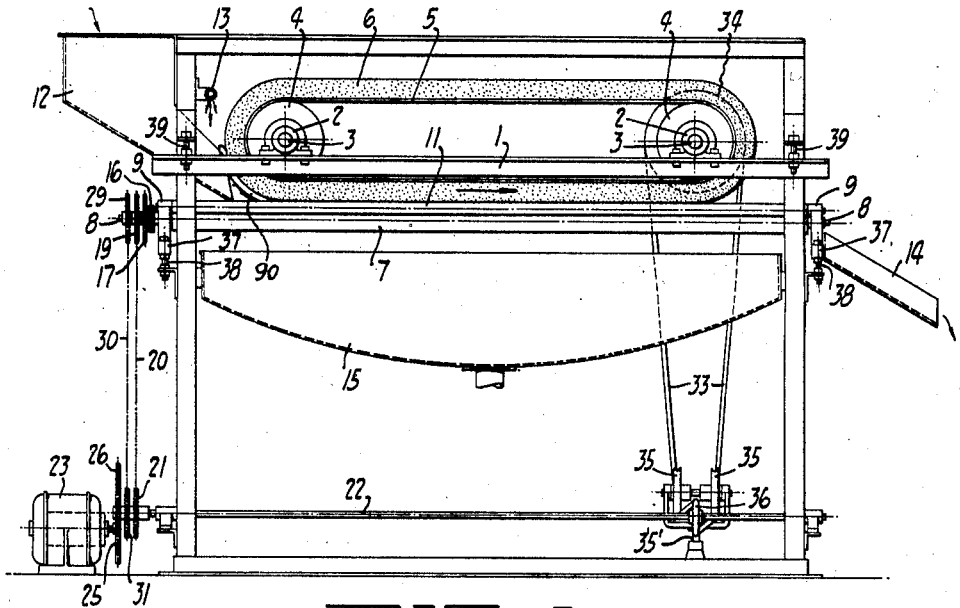
FIG_1_
FIG_2_
FIG_3_
INVENTOR
Salvador A. Minera
BY Boykens Mohler
ATTORNEYS

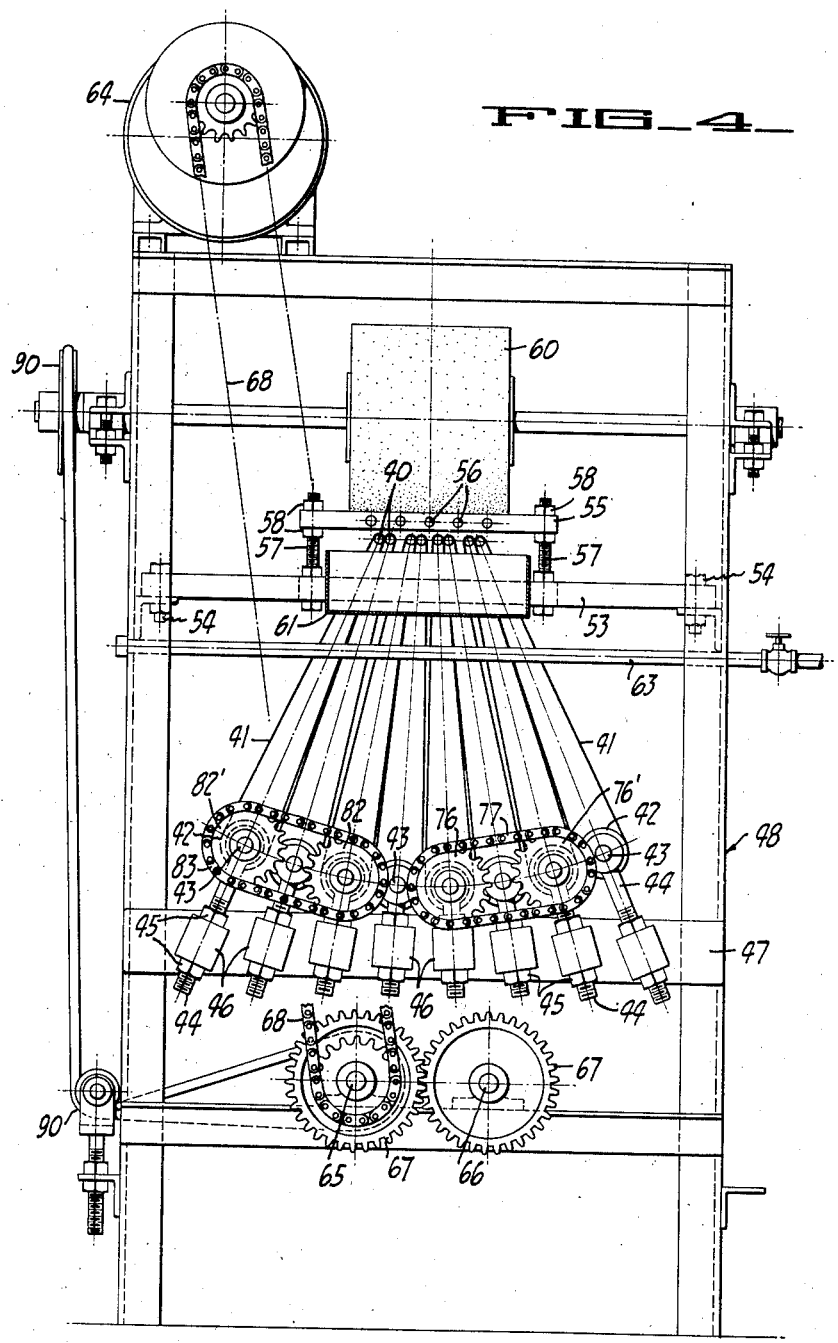

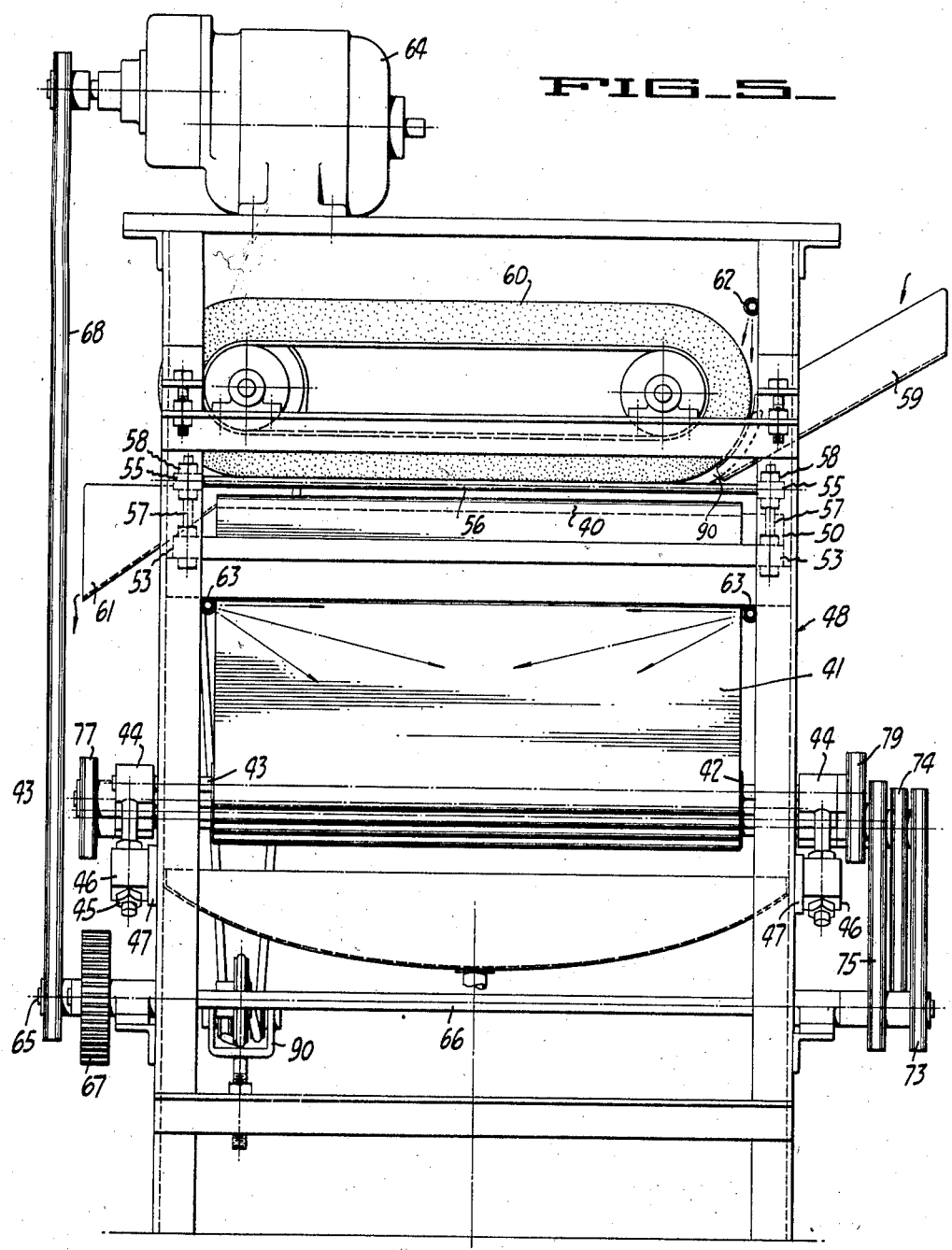

Feb. 22, 1944.  S. A. MINERA  2,342,358
FRUIT STEMMER AND METHOD
Filed May 12, 1941   4 Sheets-Sheet 4
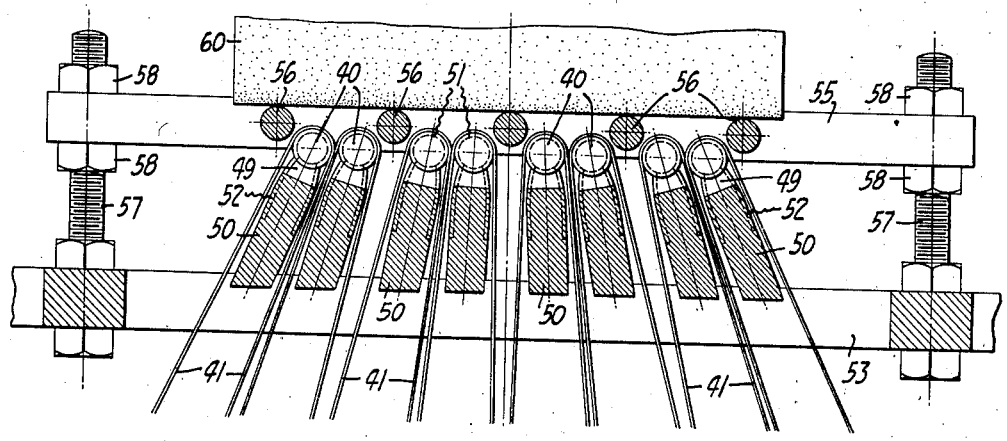
FIG_6_
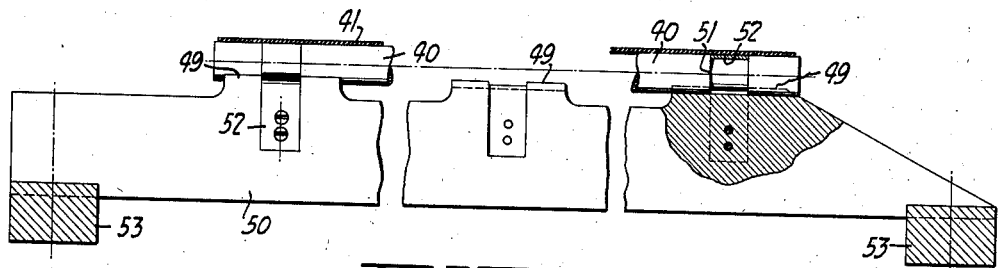
FIG_7_
FIG_8_
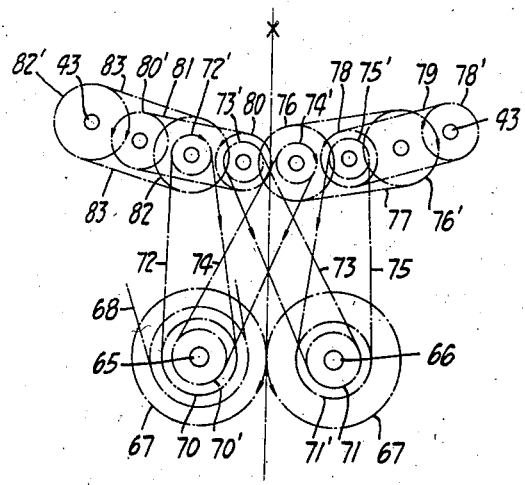
INVENTOR
Salvador A. Minera
BY
Boyken & Mohler
ATTORNEYS Patented Feb. 22, 1944

2,342,358

UNITED STATES PATENT OFFICE 2,342,358

FRUIT STEMMER AND METHOD

Salvador A. Minera, San Francisco, Calif.

Application May 12, 1941, Serial No. 393,019

12 Claims. (Cl. 146—55)

This invention relates to a fruit stemmer and method of stemming fruit in general, and more specifically, to a grape stemmer.

One of the objects of the invention is the provision of a stemming device that is adapted to remove the stems from fruit, and particularly, elongated grapes, more efficiently than heretofore, and which device will handle a large volume of fruit per hour. Another object of the invention is a stemming device adapted to remove the stems from grapes, or the like, without injury to the fruit, and which device is simple, rugged, and relatively cheap to make. A still further object is an improved method of stemming elongated grapes in which the grapes are positively revolved, or rolled, end over end, generally horizontally extending path of travel, during which movement the stems are plucked from the ends of the grapes as the ends carrying the stems are lowermost during revolution of the grapes. Other objects and advantages will be found in the specification and drawings.

In the drawings,

Fig. 1 is a side elevational, semi-diagrammatical view of my improved stemmer.

Fig. 2 is a semi-diagrammatical end view of the stemmer.

Fig. 3 is an enlarged, fragmentary, semi-diagrammatical view showing the action of the rollers and hold-down belt, that cooperate to effect the stemming of the grapes.

Fig. 4 is an end elevational view of another form of the invention.

Fig. 5 is a side elevational view of the device of Fig. 4.

Fig. 6 is an enlarged, fragmentary, part sectional, end view of the ends of the grape stemming pulleys and belts of the device of Fig. 4.

Fig. 7 is a side elevational view, broken in length, showing one of the belt supporting rollers on its bearing, with the belt shown in section.

Fig. 8 is a diagrammatic view of the drive connections for stemming rollers.

In general, my invention comprises forming a plurality of channels, the bottom of each, longitudinally thereof, comprises a pair of elongated rollers adapted to rotate in the same direction, downwardly, at their adjacent sides, and over such rollers, is a relatively soft and resilient member moving longitudinally of the rollers at a slower surface speed than the surface speed of the rollers. Grapes are fed onto the rollers, and will immediately be turned by said rollers to positions with their major axes parallel with the axes of the rollers, and the resilient member will then turn the grapes end over end from one of the ends of the rollers to the other end, while the rotating rollers prevent the grapes from turning cross-wise. Thus as each grape is revolved on its minor axis to bring the stem end down, the stem on such end will be caught between the engaging sides of the rollers and will be plucked from the grape. As hereinafter described, belt enclosed rollers may be used instead of rollers.

In detail, the device of Figs. 1 to 3 comprises a frame having generally horizontal, side, frame members 1 carrying bearings 2 that rotatably support the ends of a pair of parallel, horizontally extending, spaced shafts 3. To one each of the shafts 3 is secured a relatively wide pulley 4, and a relatively wide endless belt 5 is carried on each of said pulleys, providing a lower, downwardly facing run that is adapted to be moved longitudinally of, and over, a horizontally extending row of spaced pairs of parallel rollers 7, said rollers in the row being disposed in one plane, and the rollers of each pair being in engagement on their adjacent sides.

The belt 5 is substantially non-stretchable since the side thereof that engages the pulleys may be of canvas or conventional belting, while secured to the outer side is an outwardly facing relatively soft and resilient layer 6 of material, such, for example, as sponge rubber, or the like. This layer is relatively thick, so as to permit considerable depression of the same with little force since the outwardly facing side of the lower run of this layer engages the grapes as will be later described.

The rollers 7 are preferably rubber covered shafts 8, which shafts are to give rigidly to the rollers against springing, and the rubber covering is sufficiently thick and resilient to yield under the pressure of the grape stems that may be caught therebetween, but which will not yield under the pressure of grapes thereon when the grapes are held in engagement with the rollers by belt 5. The rollers 7 are of uniform diameters and are in a plane parallel with the lower run of belt 5, and are supported for rotation in bearings 9 (Fig. 2) at their ends. These bearings support the rollers spaced from the lower run of belt 5 a distance slightly less than the minor axis of each of the grapes 10, which grapes are generally graded before passing to the stemmer.

Rollers 7, extend at their ends beyond the ends of the lower run of belt 5 and between the adjacent pairs of rollers 7, but in a plane elevated above the rollers slightly, are elongated guide members 11 which may be in the form of rollers or rods, and on which the lower run of belt 5 is adapted to slide, since these members 11 extend longitudinally of, and parallel with the rollers 7. When members 11 are rollers, they are supported at their ends in bearings 12, or, if rods, they may be merely secured in openings corresponding to the bearings 12. The spacing of the members 11 from adjacent rollers 7 is such that any grapes falling between adjacent members 11 will be directed onto the rollers 7 of each pair, so as to be rotated under the influence of the rotation of adjacent rollers of the pairs. It will be seen from the foregoing that the adjacent members 11 form the sides of elongated channels, and the bottom of each such channel is a pair of rollers 7.

A feed hopper 12 at one of the ends of rollers 7 feeds grapes 10 onto said rollers, between members 11, and a water spray pipe 13 extending transversely across said ends and thereabove, is adapted to spray water onto the grapes in a direction to cause the grapes to roll between the rollers and lower run of belt 5 at one end of said run.

At the ends of the rollers 7 opposite feed hopper 12 is a discharge chute 14 that receives the grapes from said ends of the rollers.

The rollers 7 of each pair are rotated in opposite directions so that their adjacent sides move downwardly, as best indicated in Fig. 3, and the lower run of belt 5, at the same time moves longitudinally of the rollers from hopper 12 toward chute 14. The rollers 7 are rotated so their surface speeds are faster than the surface speed of belt 5, thus, the grapes 10 upon passing between the lower run of belt 5 and the rollers 7 will be arranged with their major axes parallel with the axes of rollers 7, and belt 2 will cause the grapes to be rolled over end from one end of the lower run of belt 5 to the end adjacent chute 14. During this rolling of the grapes when the stem ends are lowermost, the stems will be gripped between the rollers of each pair and will be plucked from the grapes, passing to a tank 15 that is below said row of rollers 7 and which tank also receives the water from spray pipe 13 for draining of the water and stems to any desired point.

The rollers 7 may be rotated in the manner above described by any suitable means. For example, in Fig. 2, four pairs of adjacent rollers are shown, two pairs being on each side of the medial plane of the device. The rollers of each pair are connected for rotation as above described, by intermeshing spur-gears 16. One of the shafts 8 of each pair of rollers at the right of the medial plane of the stemmer, as seen in Fig. 2 is provided with a sprocket 17, which pair of sprockets is connected for rotation in the same direction by a chain 18. One of the shafts carrying one of the sprockets 17, also carries a sprocket 19 over which a chain 20 passes, and which chain passes over a sprocket 21 secured on a shaft 22 that extends below tank 15 and which shaft is driven by a motor 23. The shaft is connected with the motor for being driven by the latter by a chain 24 that connects between a sprocket 25 on a reduced speed drive shaft on the motor, and a sprocket 26 on shaft 22. This connection between the motor and rollers, as described, is such that upon rotation of the shaft 22 in one direction, the rollers of each pair will rotate downwardly on their adjacent sides.

The two pairs of rollers at the left of the medial plane of the stemmer also carry intermeshing spur gears 16, and a sprocket 27 on one of the shafts of each pair of such rollers is connected by a chain 28 for simultaneous rotation of the rollers in the same manner as described for the other rollers. One of these shafts also carries an extra sprocket 29 that connects by a chain 30 with a sprocket 31 (Fig. 1) on shaft 22, the arrangement of sprockets 27, 29, 31 and chains 28, 30, being such that the rollers at the left of said medial plane will be rotated in a manner corresponding to the rollers at the right of such plane, so as to pull stems from the grapes.

While the above explanation merely describes an arrangement for four pairs of rollers, it is manifest that additional pairs of rollers may be provided with sprocket and chain connections with those described, without the exercise of invention, and the specific description as to the manner of actuating the rollers is not to be considered restrictive to such means, since there are many conventional arrangements possible for driving the rollers of each pair in the desired direction. In fact, in some instances, the intermeshing gears 16 may be eliminated and the rollers may drive each other by frictional engagement, but a positive drive is generally preferable.

The belt 5 is driven in the direction of the arrow (Fig. 2) by means of a belt 33 that extends over a pulley 34 on one of the shafts 3, and then past idlers 35 and over a pulley 36 on shaft 22. As stated before, the pulley ratio is such that belt 5 is driven at a slower surface speed than the rollers 7.

In operation, the grapes 10 with their stems attached, are fed from hopper 12 onto one of the ends of rollers 7 and where the action of rollers 7 causes the grapes to be arranged with their major axes in the vertical plane between each pair of rollers 7, and the belt 5 then moves the grapes, end over end, to the discharge chute 14. If the stems on the grapes are not plucked from the grapes after one revolution of the grapes about their minor axes, it has been found that the stems are plucked before reaching chute 14 since the stems will be repeatedly brought into position for being gripped by the rollers. The belt 5, being relatively thick and soft does not in any way injure the grapes, but yields with only slightly increased resistance as the major axes of the grapes are vertical, as shown best in Fig. 3. However, at all times, the grapes are in engagement with belt 5, and the slightly increased pressure on the grapes when the latter are in position for stemming is desirable, since the sides of the grape engaging the adjacent rollers of each pair are firmly held close to opposite sides of the stems when the latter are plucked from the grapes.

The water spray on the grapes also washes the belt 5 and rollers 7, keeping them free from undesirable material that might otherwise cling to them.

The bearings for shafts 8 and the guides 11 are carried on cross frame members 37 that are at two opposite sides of the main frame. Each of said frame members 37 are supported at their ends by vertically adjusting screws 39 so that the bearings at either of the ends of the rollers may be raised or lowered, or the plane in which the rollers are disposed may be changed in any desired manner.

Likewise, frame members 1 that carry the pulleys 4 and bearings 3 are supported at their ends on the main frame by vertical adjusting screws 40, to enable raising or lowering or otherwise changing the position of the belt relative to the rollers to insure the correct relation between the belt and rollers. The bearings for the shaft of idlers 35 may be supported on a vertical screw 35' for tightening the belt 33 when the belt 5 is in adjusted position, or at any time, since these idlers also function as a belt tightener, as well as for directing the belt to pulley 36.

In Figs. 4, 5 the same method is followed as is described for Figs. 1, 2. The sole difference is that instead of the rollers 7, I provide elongated pulleys 40 (Fig. 6), arranged in a horizontally extending row in pairs corresponding generally to the arrangement of rollers 7. Over each of these pulleys is a downwardly extending, relatively wide belt 41 that extends at its lower end over a larger diameter pulley 42. The pulleys 42 are all of the same size, and the ends of shafts 43 on which pulleys 42 are mounted are carried on adjusting screws 44 (Fig. 4) for maintaining the belts 41 at all times. These screws 44 threadedly engage nuts 45 at opposite sides of brackets 46 through which the screws freely extend, and brackets 46 are in turn secured to horizontal side frame members 47 on the main frame 48.

The pulleys 40 are best indicated in Figs. 6, 7. Each of the pulleys is rotatably supported at spaced points intermediate the ends thereof on bearings 49, projecting from the upper edge of a generally vertically extending, relatively thick plate 50.

These pulleys are annularly grooved at said bearings, as indicated at 51 and a generally inverted U-shaped strap 52 fits at the connected ends of the legs thereof in each groove, while the legs are seated in grooves at opposite sides of plate 50 and are secured to said plate. Thus the pulleys 40 are held against longitudinal movement by the straps 52, which also hold the pulleys on the plates 50.

The plates 50 are secured at their ends on side frame members 53, the upper sides of which are grooved to receive and to position said plates in proper spaced relation. The lower edges of said plates are preferably cut at an angle to the sides, as best indicated in Fig. 6, so that the plates lie in the planes in which the parallel axes of each pair of pulleys 40, 42 are positioned. Thus the pull on pulleys 40 is in the plane of each plate 50 and there is no tendency of the plates to be tilted out of the plane in which each is disposed.

The ends of side frame members 53 are secured by vertical adjusting screws 54 (Fig. 4) to the main frame members 48 for adjusting the pulleys 40 in the same manner described for rollers 7.

Above the level of the upper ends of belts 41 but outwardly of the ends of the pulleys and side edges of said belts are horizontal strips 55 carrying rods 56 corresponding in position and function to members 11 of Fig. 3. These strips 55 are supported at their ends on vertical screws 57 carried by frame members 53 and between nuts 58 on said screws for vertically adjusting said rods 56 to any desired spacing above the upper ends of belts 41.

A feed hopper 59 feeds the grapes onto the upper ends of belts 41 adjacent one of their edges for being revolved end over end by belt 60 to the discharge chute 61 at the opposite edges of belts 41.

The belt 60 corresponds in every respect to belt 5 of Fig. 1 and functions in the same manner. Likewise a water spray pipe 62 adjacent hopper 59 functions exactly like spray pipe 13. The belt 60 is mounted for adjustment and movement the same as belt 5, hence it will not be necessary to repeat the description of the same.

In addition to spray pipe 13, however, I provide a pair of similar spray pipes 63 at opposite edges of belts 41 between pulleys 40, 42 that are perforated to eject water to between the adjacent runs of adjacent belts 41, thus cleaning the belts of stems or other material that may have stuck to the belts.

A motor 64 is supplied on the main frame 48 for driving the belts 41, 60 so that the adjacent runs of the belts 41 of each pair that engage each other over pulleys 40 will move downwardly, and so that the lower run of belt 60 will move in direction from hopper 59 to chute 61.

This drive for belts 41 and belt 59 may substantially correspond to that for Figs. 1, 2 except that the pulleys 42 are driven instead of rollers 7. Another manner is to provide a pair of parallel shafts 65, 66 with intermeshing spur gears thereon to drive one of said shafts by a sprocket-chain connection 68 with motor 64.

Fig. 8 diagrammatically illustrates the means for driving belts 41 in which there are a pair of sprockets 70, 70' on shaft 65 and a pair of sprockets 71, 71' on shaft 66. Sprocket 70 connects by a chain 72 with a sprocket 72' secured to one of pulleys 42 of one pair at one side of the medial plane X of the stemmer while sprocket 71 is connected by a chain 73 with a sprocket 73' of the other pulley of the said pair. The sprocket 70' connects by a chain 74 with a sprocket 74' of one pulley in one pair of adjacent pulleys at the other side of said medial plane while sprocket 71' connects by chain 75 with a sprocket 75' of the other pulley of said pair. The pulley carrying sprocket 74' carries sprocket 76 that connects by chain 77 with sprocket 76' of a pulley of an adjacent pair of pulleys while a sprocket 78 on the pulley carrying sprocket 75' connects by a chain 79 with a sprocket 78' on the other of said adjacent pair. Thus upon rotating shaft 65 in the direction indicated by the arrow adjacent said shaft (Fig. 7) the pairs of adjacent runs of the adjacent pairs of belts 41 at one side of the medial line X will be moved downwardly, and the stems on grapes that are supported on the upper ends of said belts will be plucked from the grapes.

On the other, or left hand side of medial line X, it will be seen that the belts on the pulleys driven by sprockets 72', 73', which are the pulleys of one pair, will be similarly driven to those on the right hand side, and as the pulley carrying sprocket 43 also carries a sprocket 80 that connects by chain 81 with sprocket 80' of one of the pulleys of the pair adjacent thereto, and as the pulley carrying sprocket 72' also carries a sprocket 82 that connects by a chain 83 with sprocket 82' on the other pulley of the adjacent pair, it will be seen that all of the belts in the row will be simultaneously actuated upon rotation of shaft 65 to properly pull stems from grapes on the upper ends of the belts. Needless to say, the sprockets carried on all the pulleys are of the same size and all other driving connections are such as to insure the driving of the pulleys and belts 41 at the same rate of speed.

The belt 60 over the pulleys 40 is driven by a belt and pulley connection, the elements of which designated 90 (Fig. 5) are driven by shaft 65 with which the belt connects in the same manner as in Figs. 1, 2 so as to move the lower run of belt 60 from the feed hopper to the discharge chute.

It is pertinent to note that in my device and method, the grapes are not stationary when the stems are pulled therefrom, but instead, the stem ends of the grapes and the stems are simultaneously moved apart, since the grapes are revolved to carry their stem ends upwardly as the stems are pulled downwardly. This results in a very rapid plucking of the stems. Also, the fact that the grapes move end over end on a bed of rotating pairs of rollers, insures the stems being caught between adjacent rollers during at least one of the revolutions of grapes, since the grapes tend to be slightly shifted on their longitudinal axes as they roll along, thus shifting the stems on said axes and eventually positioning the stems for proper plucking.

While the foregoing description, and claims, specifically refer to grapes, it is understood that this reference does not necessarily limit the invention to use in stemming grapes, but the invention is intended to extend to any fruit from which stems may be plucked in generally the same manner. I have, for example, found that where the stems are relatively strong, even though the fruit is not elongated, but are more nearly spherical, the projecting stems will function to turn the fruit when it is fed onto the rollers or belts to cause the fruit to be revolved in the desired manner for plucking the stems.

Also the use of the term "rollers" in the claims, is intended to cover the belt covered upper rollers shown in Figs. 4 to 7 since the fruit supporting surfaces are cylindrical surfaces that are identical with rollers that engage each other at adjacent sides.

The belt arrangement is more costly than rollers, but the stem engaging points are distributed over a far greater area than the mere use of rollers, thus reducing the rate of wear and facilitating cleaning thereof where used with certain fruit, but with an adequate water spray on the grapes, it is found that either the roller system or the belt system is satisfactory and the rollers and belts remain clean.

I am aware of stemmers in which grapes are rolled by gravity down inclined channels, and rollers below the channel are intended to pluck the stems from the grapes, and I am aware of attempts to roll fruit by gravity along rollers, but these attempts have not been successful and have been abandoned, since the grapes will either slide on their sides, or will roll about their longitudinal axes, or will bounce on the rollers if they roll end over end, and when a stem is accidentally engaged by chance between the rollers, the grape is held stationary while the stem is plucked, or is haphazardly knocked over by other grapes.

Attention is called to the fact that a curved upward extension 90 is provided on each of the members 11 or 56 (where these members are rigid) at the ends of said members adjacent the hopper 59, which extensions slidably engage the belt 60 (Figs. 1, 5) to insure against the grapes or fruit being caught between the belt 60 and members 56 where they are fed to rollers 7.

Having described my invention, I claim:

1. The method of stemming grapes and the like that comprises the steps of; positively rolling the grapes mechanically in a generally horizontally extending path of travel; forceably holding the grapes down against a supporting surface during such rolling thereof for revolution of their stem ends in a substantially vertical plane about horizontal axes; plucking the stem from each of the grapes while said grapes are rolling in said path, whereby the stem ends of said grapes and the stems to be plucked therefrom will simultaneously move oppositely from each other during said plucking operation.

2. The method of stemming grapes and the like that comprises the steps of; supporting a row of grapes in forceable engagement with and between a relatively soft, yieldable surface and a relatively harder surface with the stem ends of the grapes in a plane substantially longitudinally bisecting the row; moving said surfaces relatively in direction longitudinally of said row thereby causing the stem ends of said grapes to revolve about horizontal axes longitudinally of said row; plucking the stems from said grapes adjacent one of said surfaces during said revolution of the grapes.

3. The method of stemming elongated grapes, or the like, having a stem projecting from one of their respective ends, that comprises; rolling such grapes end over end along a path of travel; supporting said grapes during said rolling thereof against spaced supporting surfaces at opposite sides of a plane bisecting the grapes longitudinally thereof during said rolling; holding the grapes snugly against said surfaces during said rolling; and plucking the stem from each of said grapes at a point between said surfaces while the grapes are being rolled along said surfaces and are held thereagainst.

4. The method of stemming elongated grapes, or the like, having a stem projecting from one of their respective ends, that comprises the steps of: arranging said fruit in a generally horizontally extending row with their axes in a single substantially vertical plane; positively supporting said grapes at opposite sides thereof in said plane and with their major axes in said plane while positively rolling the grapes at a uniform rate of speed end over end longitudinally of said row; and plucking the stems from the ends of said grapes as said grapes are so rolled.

5. The method of stemming elongated grapes, or the like, having a stem projecting from one of their respective ends, that comprises the steps of supporting the grapes in engagement with and between substantially opposed supports while positively revolving each grape about its minor axis and at the same time positively moving each grape bodily in the plane of its major axis at a substantially uniform rate of speed along a path of travel and for substantially the full length of said path, and simultaneously with said revolution and said movement of each grape, pulling the stem away from each grape in a direction at right angles to the direction of said movement.

6. A grape stemmer for elongated grapes comprising: a pair of vertically spaced, horizontally extending, parallel devices disposed one over the other, the adjacent sides of which define a horizontally extending passageway; the upper of said devices being a horizontally disposed sheet of relatively soft, resilient material spaced from the lower of said devices substantially the length of the minor axis of each of said grapes; means moving said sheet longitudinally of said passageway, and said lower device being arranged and adapted to position said grapes with their longitudinal axes disposed longitudinally of said passageway, whereby grapes between said devices will be rolled end over end longitudinally of said passageway, and the lower of said devices being arranged and adapted to pluck the stems from one of the ends of said grapes during said rolling of the latter.

7. In a construction as defined in claim 6, the lower of said devices being a pair of elongated rollers disposed side by side in a horizontal plane and extending longitudinally of said passageway; the adjacent sides of said rollers being substantially in engagement with each other; means for rotating said rollers simultaneously in opposite directions in which their adjacent sides move downwardly.

8. In a construction as defined in claim 6, the lower of said devices being a pair of elongated rollers extending side by side in a horizontal plane and extending longitudinally of said passageway; the adjacent sides of said rollers being in substantial engagement with each other; the upper of said devices being the lower run of an endless belt; means for rotating said rollers simultaneously in opposite directions at the same speed in which their adjacent sides move downwardly; and the means for actuating said belt being arranged and adapted to move said belt at a surface speed that is slower than the surface speed of the rollers, whereby said rollers will tend to hold the grapes thereon for revolving end over end from one of the ends of the rollers to the other by movement of said belt.

9. In a construction as defined in claim 6, adjusting means supporting said sheet and said lower device for movement relatively toward and away from each other, and means for locking said sheet and said lower device in adjusted position against said movement.

10. In a grape stemmer, the combination comprising: means arranged and adapted to support a plurality of grapes in a plurality of parallel rows disposed in a common plane and to position the grapes in each particular row with their stems in each such row substantially in a single plane extending longitudinally of such row and at right angles to said common plane; means for rolling said grapes in direction longitudinally of said rows respectively; said first mentioned means being arranged and adapted to pluck the stems from said grapes as the grapes are rolled by said second mentioned means.

11. In a grape stemmer, the combination comprising: elongated, vertically spaced, horizontally extending, parallel grape engaging members arranged and adapted to hold a generally horizontally extending row of grapes therebetween with said members in engagement with substantially opposite upper and lower sides of each of the grapes in said row; means for moving said members relatively in direction longitudinally of said row for rolling the grapes so engaged thereby longitudinally of said row; the lower of said grape engaging members being arranged and adapted to pluck the stems from said grapes during said relative movement of said members, and to support said grapes during rolling thereof in a position to cause the stems on the grapes in said row to move in similar cycloidal paths of travel substantially coplanar with a common vertical plane substantially bisecting the grapes of said row.

12. In a grape stemmer, the combination comprising; a generally horizontally extending row of generally vertically extending, relatively wide, endless belts; a row of pulleys supporting the upper ends of said belts in a single, substantially horizontal plane; said pulleys being arranged in spaced pairs supporting said upper ends of the belts in spaced pairs with the adjacent sides of the upper ends of each pair of belts in engagement; means actuating said belts simultaneously for downward movement of the adjacent runs of the belts of each pair; means for feeding elongated grapes onto the upwardly facing upper ends of said belts, means for rolling such grapes end over end transversely of the width of said belts, whereby the stems will be plucked from the grapes between the engaging upper ends of the belts of each pair; said last mentioned means comprising a single, endless, horizontally extending belt; a pair of pulleys supporting said single belt in a position with the lower run thereof extending over the upper ends of the belts of said row and in a direction transversely of said upper ends.

SALVADOR A. MINERA.